(12) United States Patent
Caswell et al.

(10) Patent No.: US 6,662,355 B1
(45) Date of Patent: Dec. 9, 2003

(54) METHOD AND SYSTEM FOR SPECIFYING AND IMPLEMENTING AUTOMATION OF BUSINESS PROCESSES

(75) Inventors: Nathan S. Caswell, Yorktown Heights, NY (US); Arthur C. Ciccolo, Ridgefield, CT (US); Anil Nigam, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/372,030

(22) Filed: Aug. 11, 1999

(51) Int. Cl.$^7$ ................................................. G06F 9/44
(52) U.S. Cl. .......................................... 717/103; 705/1
(58) Field of Search .................... 717/100, 103, 717/108, 127, 128; 707/202, 10; 705/1, 8, 9; 709/201

(56) References Cited

U.S. PATENT DOCUMENTS

| | | | | |
|---|---|---|---|---|
| 5,819,022 A | * | 10/1998 | Bandat ........................ | 714/16 |
| 5,872,915 A | * | 2/1999 | Dykes et al. .......... | 395/188.01 |
| 5,890,133 A | * | 3/1999 | Ernst .............................. | 705/7 |
| 5,892,905 A | * | 4/1999 | Brandt et al. ............... | 713/201 |
| 5,930,512 A | * | 7/1999 | Boden et al. ................ | 395/710 |
| 5,958,003 A | * | 9/1999 | Preining et al. ............ | 709/100 |
| 5,960,420 A | * | 9/1999 | Leymann et al. ............... | 707/1 |
| 6,009,405 A | * | 12/1999 | Leymann et al. ............... | 705/9 |
| 6,011,917 A | * | 1/2000 | Leymann et al. ........... | 395/702 |
| 6,028,997 A | * | 2/2000 | Leymann et al. ........... | 395/701 |
| 6,029,144 A | * | 2/2000 | Barrett et al. .................. | 705/30 |
| 6,038,538 A | * | 3/2000 | Agrawal et al. ............... | 705/7 |
| 6,065,009 A | * | 5/2000 | Leymann et al. ............. | 707/10 |
| 6,073,111 A | * | 6/2000 | Leymann et al. ............... | 705/8 |
| 6,122,633 A | * | 9/2000 | Leymann et al. ............. | 707/10 |
| 6,125,384 A | * | 9/2000 | Brandt et al. ............... | 709/203 |
| 6,138,088 A | * | 10/2000 | Goeser ........................... | 704/9 |
| 6,237,020 B1 | * | 5/2001 | Leymann et al. ........... | 709/201 |
| 6,278,977 B1 | * | 8/2001 | Agrawal et al. ............... | 705/7 |
| 6,308,224 B1 | * | 10/2001 | Leymann et al. ........... | 709/310 |
| 6,345,256 B1 | * | 2/2002 | Milsted et al. ................. | 705/1 |

OTHER PUBLICATIONS

"Client/Server Programming With JAVA and Corba" Second Edition Robert Orfali et al, p. 866, Jan. 30, 1997.*
"Template Software Rolls Out Corporate and Product Growth Strategies at Solutions 97 Conference", PR Newswire, Apr. 3, 1997.*
"Template Software Strengthens Cove Product Family With Ease–of–Use and Functional Enhancements That Promote Unparalleled Software Re–Use", PR Newswire, Jun. 23, 1997.*
"Developing a WFT Workflow System", Version 8.0 Template Software, Chapters 1–10, Appendix A, Sep. 1997.*
"Using the WFT Development Environment" Version 8.0, Template Software, Chapters 1–9, Appendix A, Sep. 1997.*
"Principles of Object–Oriented Analysis and Design", James Martin, Chapters 1–6, 17–22, Oct., 1992.*

\* cited by examiner

*Primary Examiner*—Todd Ingberg
(74) *Attorney, Agent, or Firm*—Whitman, Curtis & Christofferson, P.C.; Stephen C. Kaufman

(57) ABSTRACT

A method s for specifying and implementing automation of business processes where the specification is independently manipulable by both the business process owner and technical implementers, and resulting technical elements can be tested for compliance with every detail in the specification. The method creates a single shared model suitable for understanding and execution in both the business and technical domains by focusing on the specification problem in the area of business automation. The solution to the specification problem lies in Information, Function, Flow (IFF or IF$^2$) factorization of business processes. Models of the business are constructed by way of the IF$^2$ modeling methodology. This is a complete model which includes, by construction, external specifications of each task included in the business model. The modularization problem is solved by preserving the partitioning of the system created in the business model. The automation system implements concrete modules that uniquely and directly correspond to particular elements whose external specification is determined by the business model.

9 Claims, 5 Drawing Sheets

METHOD AND SYSTEM FOR SPECIFYING AND IMPLEMENTING AUTOMATION OF BUSINESS PROCESSES

BACKGROUND OF THE INVENTION

1. Field of the Invention

The present invention generally relates to business automation systems and, more particularly, to a method for solving the specification problem which forms the technical foundation for a network-based business automation utility.

2. Background Description

Automation depends on converting understanding of a business's operations, procedures, and intent into execution by a set of technical elements. Today, this requires a long complex series of transformations. Open ended and often fuzzy business understanding must be transformed into execution of that understanding through steps producing definitive requirements and specifications, analysis for technology requirements, logical design, physical implementation, and business implementation. Each of these steps has its own context with methods for determining what is important in the description and solution of problems. Even when smoothed by reuse and standardized components, today's path from business need to operational automation is a difficult one.

Present technical systems either provide a fixed range of functionality which may be organized into custom configurations at high cost or are hindered by abstract models and technical issues separated from the concrete realities and concerns of the business.

In existing system architectures technical solutions typically repartition the business problem to provide an overall solution. Paradoxically, this requires the business process owners to understand the technical details in order to judge the efficacy of the solution. Inexorably this drives the dominant description of the problem to the technical domain and thereby jeopardizes the control the business has over the automation system.

SUMMARY OF THE INVENTION

It is therefore an object of the present invention to create a single shared model suitable for understanding and execution in both the business and technical domains.

The invention focuses on the specification problem in the area of business automation. The specification and implementation of automation of business processes is accomplished such that the specification is independently manipulable by both the business process owner and technical implementers, and resulting technical elements can be tested for compliance with every detail in the specification.

The solution to the specification problem lies in Information, Function, Flow (IFF o r $IF^2$) factorization of business processes. Models of the business are constructed by way of the $IF^2$ modeling methodology.

According to the invention, there is provided a means and method for business automation that unifies the solution of two problems heretofore assumed to be disjoint. Taken together, their solution forms the technical foundation for the construction of network-based business process automation (BPA) systems. These problems are:

1. The Specification Problem: How to easily and efficiently develop business automation software so that the information processes for a business can be automated in a customized way, as opposed to the more typical software solution, such as Enterprise Resource Planning (ERP) packages like the SAP suite of products available from SAP AG. Current approaches to business modeling do not easily map to controllable technical implementation.

2. The Modularization Problem: The difficulties involved in reuse and maintenance are well known. Many of these stem from the initial factorization of the business problem and their mapping to the technical domain. How to package the software in such a way that it is broken into separate modules which by extension are capable of running on separate, small, embedded processors acting as intelligent processor nodes. The solution does not require a server that runs all the software (again, as with an SAP solution to business automation), but rather is run on many, small and inexpensive distributed processor nodes.

The specification and modularization problems are solved using an Information, Function, Flow ($IF^2$) factorization of business processes. The mechanism for creating a system specification is to create a model of the business from $IF^2$ elements. This is a complete model which includes, by construction, external specifications of each task included in the business model.

The modularization problem is solved by preserving the partitioning of the system created in the business model. The automation system implements concrete modules that uniquely and directly correspond to particular elements whose external specification is determined by the business model. A desirable characteristic unique to this solution of the modularization problem is that the cost of changes in the system is proportional to the amount of change in the business model.

The solution to the business process automation (BPA) problem follows from the $IF^2$ business model (the solution to the specification problem) and a partition preserving implementation of the $IF^2$ modules (the solution to the modularization problem). The system specification depends only on the business model: the external specification of the defined implementation elements is provided by the same system specification.

A significant consequence of the BPA solution is encapsulation of technological concerns. The business process owner (customer) need only be concerned with their business process and not with any of the technical details of the implementation. For example, the business specifies in detail the operation of a business specific process rather than focusing on client-server technology or specific data base behaviors. Correspondingly, the technical implementor need only construct and validate individually the implementation modules that match the provided external specification regardless of their internal design.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The concrete elements by which the invention solves the problems listed above are a factorization of a business model into Business Artifact Instances, Business Artifact Categories, Business Tasks, and Business Flow Topologies. In order to better explain the method of the invention, the sales process in quick service restaurants is used as illustration.

Figure 1:
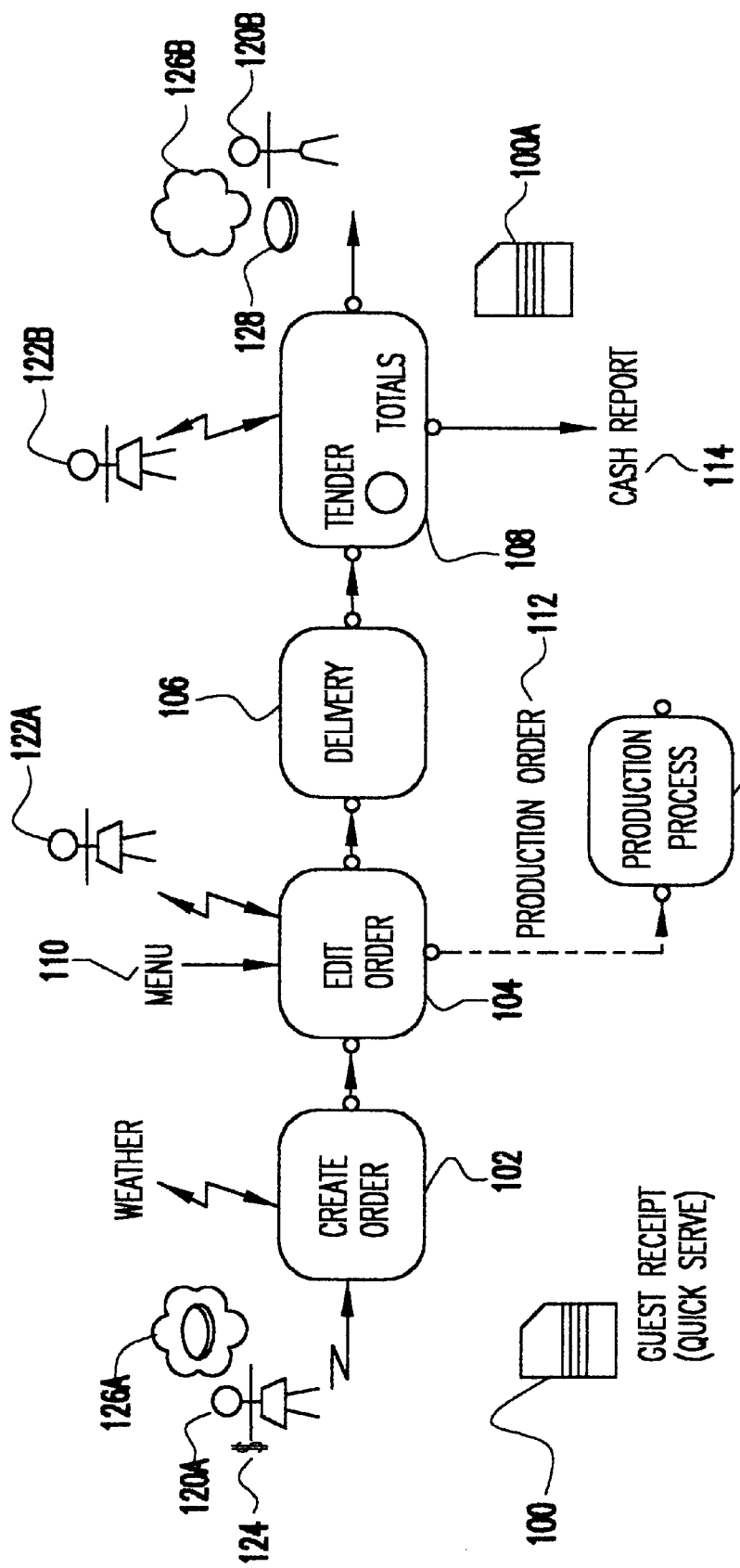
FIG. 1 is an example Information, Function, Flow (IFF) model of a sales process in quick service restaurants.

Referring now to the drawings, and more particularly to FIG. 1, there is shown a simplified example IF² model. In this example of the sales process, the primary artifact is the Guest Receipt 100. The tasks required for a completed sale are CreateOrder 102, EditOrder 104, Delivery 106, and Tender 108. Menu 110 is an external information resource while ProductionOrder 112 and CashReport 114 are artifacts created by the sales process and processed by the ProductionProcess 116 and CashReportProcess (not shown) processes respectively. The EditOrder task is connected to a process with a dashed line. This indicates that the Production Process is separate from the Sales Process, as shown.

One should note that in this representation, the people involved in the process are also shown in the model. At the beginning of the process, person 120a has money 124 and is thinking of food 126a. Person 122a takes the order at the EditOrder process 104. This may or may not be the same person 122b who tenders the cash and delivers the food at the Tender process 108. At the end of the transaction, the person 120b is shown with the food 128 and being thoughtless 126b. The Guest Receipt 100 may also be somewhat changed throughout the process, as indicated by Guest Receipt 100a.

Business Artifact Instances are individual, concrete, identifiable containers of information. As a model element, these are the units of operational information such as actual sales slips, item inventory reports, etc. As an implementation element, they are typeless information bearing elements and a set of category recognition predicates implemented over the same typeless information elements. Business artifact instances have the following properties:

They are independent of each other and the context in which they were created;

They are the only container of business information and collectively contain all the business information in the business model;

They can be recognized as belonging to particular categories; and

They have no prior constraints on their information content.

Business Artifact Categories are a specification of information content suitable for recognition of artifact instances. The information in a business artifact category is sufficient, for example, to determine whether the artifact instance is recognizable as a GuestCheck. As a model element, the categories represent the kinds of artifacts used in the business. As an implementation element, they are boolean predicates applicable to any artifact instance. Boolean expressions over artifact categories (such as "GuestCheck AND WeatherReport" or "GuestCheck AND (NOT PaidGuestCheck)") are also artifact categories.

Business Tasks are a specification of activity, particularly activity involving transformation of a Business Artifact. As a model element, these are the activities involved in a particular step of a business process. As an implementation element they are encapsulated execution elements denoted as Agents which autonomously process individual artifacts received as reified messages at their input ports. Business tasks have the following properties:

They only perform the activity of operating on an artifact instance that is either received by the business task or created internally and then send the artifact out on one of multiple outputs;

They may initiate the activity of internal creation of an artifact based on an external event;

They operate only by adding to, removing from, or modifying the information content of artifact instances or by creating or destroying artifact instances; the property of artifacts instances that they contain all the information content of the business model is preserved;

They actively operate only on a subset of artifact instances recognized as being in an artifact category defined for that business task and termed the "precondition"; artifacts in the category defined by the precondition are not modified in any way;

They define an artifact category for each of the task outputs, termed a "postcondition" and guarantee that artifact instances sent to that output are recognized as being in the postcondition category (with the implication that any artifact instance will be recognized as being in the category represented by the union of postconditions);

They may utilize external resources (such as a graphics user interface (GUI), a legacy software system, or a repository of artifacts), provided this does not generate an implicit information transfer between business tasks.

Business Flow Topologies are a specification of the connections which determine the possible sequence of business tasks an artifact instance may follow for a particular business process. As a model element, it is a directed graph of connections between business tasks. As in implementation element it is the means to encapsulate communication paths among the Agents specified by a business process and enable agent-to-agent artifact transfer.

These elements are combined to form both a business model and automation system which conform to the same specification. Distinguishing features of these elements from known prior art are:

Construction of model from concrete operational entities rather than from conceptual entities;

Separation of category from instance;

Definition of "process" as the sequence of transformations of a single concrete artifact;

Strict factorization in the sense that artifact categories contain no information about and do not depend on actual or possible transformations of artifacts and agents contain no information about and do not depend on the sequencing of agents.

Given these modeling elements, the method for constructing a system to implement a particular business process is as follows:

1. Identify the "primary" business artifact category which describes the artifact product of the business process;

2. Identify the distinct steps required to transform the primary artifact from an initial (or empty) state into its final form;

3. For each step identify the information that is added, removed, or modified in the artifact and the static information (artifact) resources required to effect the transformation;
4. Define a topology of connections between the Agents specified in step #3, above; and
5. For each of the static information (artifact) resources used in step #3 above, repeat steps #2 through step #4. When there are no more artifacts for which steps #2 through step #4 have not been executed, then terminate the procedure.

$IF^2$ is an advantage over the prior art but is related to the areas of data flow modeling and flow based programming. Data flow modeling, as generally understood from relational data base applications, teaches that functional modules can be specified by their input and output types and organized into networks of sequential modules. The "data" is maintained within a global schema accessible from each function while a token is passed between the functions. In $IF^2$ there is no notion of a single global storage for all the data. Each artifact stands independently and passed from agent to agent "by value and identity" rather than by reference. $IF^2$ is further distinguished by the fact that there is no "type" for the artifact instances flowing through the network. Each instance is only recognized within the processing module rather than by a system constraint. $IF^2$ is further distinguished by the partitioning of sets of agents into business processes which perform the end to end production of a particular artifact.

The "Hermes" project, as described in Strom, Bacon, Goldberg, Lowry, Yellin and Yemini, *HERMES: A language for Distributed Computing*, (Prentice Hall Series in Innovative Technology: 1991), teaches the use of independently executing modules that are protected from each other, the use of a distinct communication channels as the medium of information transfer between modules, and the use of defined data types as the content of the information transfer. It is similar to data-flow so $IF^2$ is distinguished by the features stated above. In addition, Hermes supports a command-like interface where data sent to a particular port will cause the module to perform one activity while the same data sent to another port will result in different activity. In $IF^2$, the activity is solely determined by the agent's recognition of the received artifact. This is reflected in the fact that there is only one input port through which all artifacts are received.

Flow Based Programming (FBP), as described in Morrison, van Nostrand Reinhold, *Flow Based Programming: A New Approach to Application Development*, (1994), teaches the use of independent functional modules and entities that are "like a record in storage, but active (in that it triggers events) rather than passive Oust being read or written)." id Like Hermes, FBP supports selection of function by input port. $IF^2$ is also distinguished by the nature of the transferred entities which in $IF^2$ represent independent, meaningful artifacts in the business. FBP entities are indeed more like records which have dependencies on each other and which are instances of a predefined type.

As can be surmised by the foregoing description and the following detailed discussion, the distinguishing points in $IF^2$ center on the nature of the information represented and how it interacts with the processing accomplished by the system. This analysis extends further afield to clearly distinguish $IF^2$ from systems implemented with object oriented (OO) or data base oriented methods.

Object oriented based systems rely on the encapsulation of data with function and communication between objects through structural call mechanisms. $IF^2$ encapsulates these three elements separately: information is encapsulated in independent artifacts that have no "methods" (in the OO language) other than information access; function is encapsulated in agents whose "method" is fixed; communication between modules is not call based in that once a message is sent, no return information (except that required to reliably transfer the message) is received. The instances in OO are necessarily instances of some class and constrained by the definition of that class. In $IF^2$ instances are not based on a class structure but may contain any information whatsoever.

Data base systems focus on definition of the underlying data and require an associated programming system. Examples are procedural, OO, or Fourth Generation Languages (4GL) to create complete systems. Like OO instances, either individual rows in a relation or views over some combination of relations, are instances of a class. It is not possible to express individuals which contain information not defined in the schema. Indeed, the notion of an individual artifact is not a natural construction. The overall view is of a single entity, the business data, consisting of (potentially) arbitrarily interdependent data element. Partitioning of this large, complex, single entity is accidental or fortuitous. The totality of the business information in $IF^2$ is represented by the unstructured collection of artifacts, each of which represents an independent, individual.

Agents are a key element of the implementation, thus their characteristics will be described in some detail, below.

Figure 2:
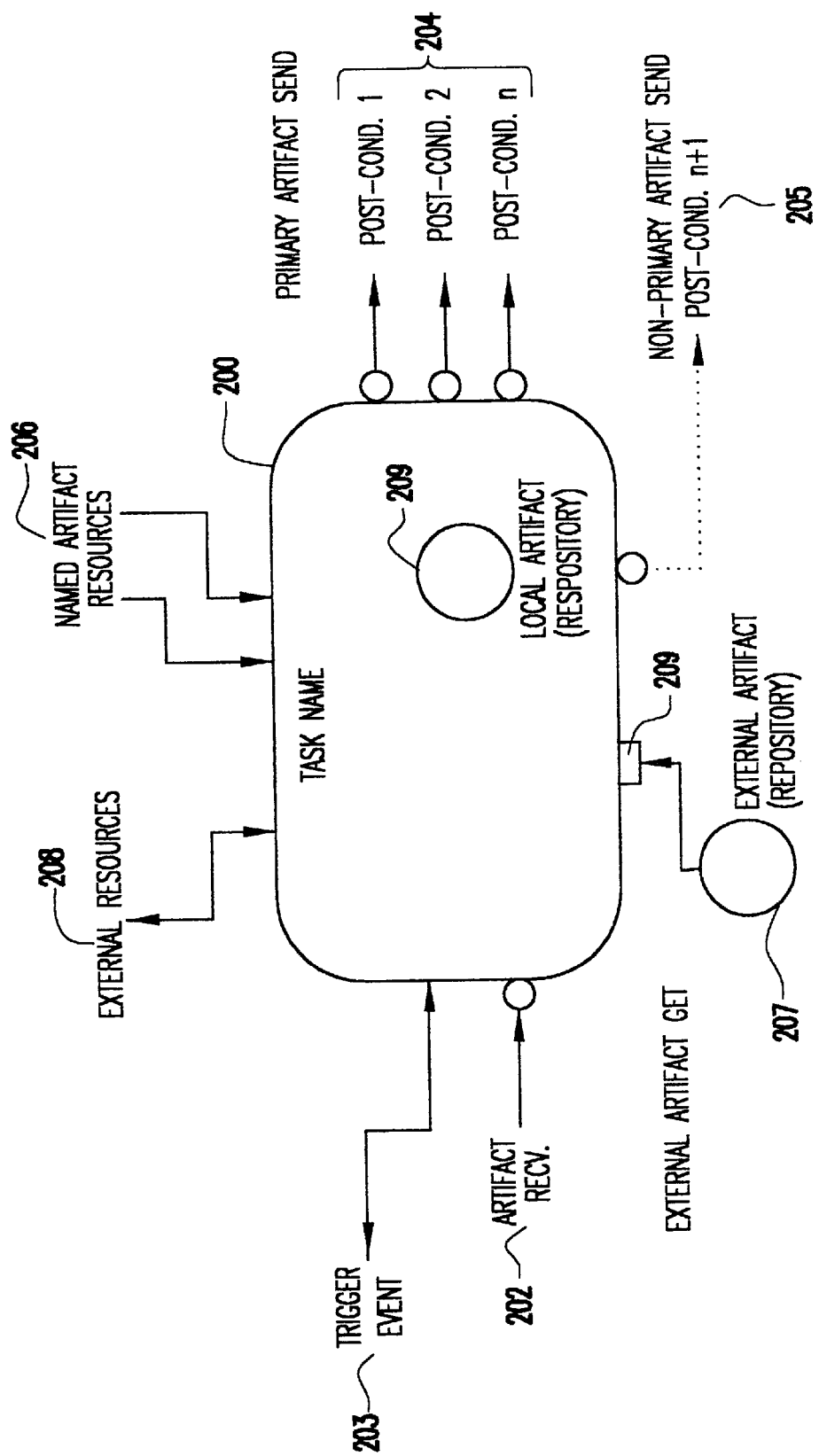
FIG. 2 shows the external characteristics of an agent, according to the method of the invention.

The external characteristics of an agent are shown in FIG. 2. The agent is drawn as a box (with rounded corners) 200 with an input port to the left 202 and output ports to the right 204 and 205. The ports are indicated by small circles attached to the agent box. Artifacts are transported to the agent through communication paths represented by solid lines with solid arrow heads. The arrow head may be centered along the line path in some representations. Artifacts are received or sent by the ports atomically, i.e. the unit of transfer is an entire artifact. This differs from the superficially similar UNIX text filter where the basic unit of transfer is a single character. This can be a big difference since artifacts may, in principle if not in practice, be arbitrarily large. Technically it is more like the file transfer between job steps in job control language (JCL) although the semantic chunking of the transferred data is very different.

The interface to an agent comprises the following elements:

A single "artifact receive" input port 202 or a single event interface for handling a "trigger event" 203; an agent is activated either when an artifact arrives on its input port or a trigger event is received;

One or more "primary artifact send" ports 204; once an agent has completed its processing, the primary artifact is sent out to one of these output ports;

Zero or more "non-primary artifact" send ports 205; these ports are used to send out non-primary artifacts that are created during the processing done by the agent;

Zero or more "external artifact GET" ports 209; these ports are used to obtain an artifact available in a known external artifact repository 207;

Zero or more "named artifact resources" 206 provide static versions (i.e. unmodifiable copies) of artifacts as needed by the agent for its processing of the primary artifact;

Zero or more "external resources" 208 provide function assistance to the agent in its processing of the primary artifact; examples are a user-interface to solicit information from a human user, connection to an external system that provides a well-defined function interface; and Zero or more local artifact repositories 209.

The most important characteristic which distinguishes an agent 200 from simple filters, servelets, or one of several other styles of functional decomposition is its explicit pre- and post-condition processing. There is only one input port 202 on an agent, and that port will receive any artifact sent to it. However, the agent will actively process only those artifacts which match the precondition. The precondition is a logical expression over categories such as GuestCheck $\wedge$ $\neg$PaidGuestCheck, where GuestCheck, PaidGuestCheck and the expression are categories, and "$\wedge$" indicates a logical AND and "$\neg$" indicates a logical NOT. Even if an artifact falls in the precondition category the agent may perform an identity transformation, i.e. there is no requirement that the artifact be modified. Such a situation does suggest too loose a precondition, however.

Multiple send ports 204 are allowed where each port has an associated post-condition (category). The post-conditions are required to be exclusive, i.e. any artifact must match one and only one post-condition. The semantics of a send port is that an artifact sent through it is guaranteed to be recognized by the category expression given in the post-condition. Since the agent will accept any artifact, the union of post-conditions must be any artifact, but this is generally accommodated through the use of a default port. Another convention generally adopted is an ordering of the send ports where the expression "and not recognized under any previous port" is implicitly added to each post condition. This works well for the common case where post-conditions are specializations of one category.

In addition to the artifact receive 202 and send 204 ports, it is necessary to show the resources used by agents. Resources have two essential flavors. They are:

other artifacts of the business (which as will be seen below are created as the result of some defined business process) used as sources of context or direct information and external functionality used by the artifact to accomplish its business task.

Resources are represented graphically by solid lines with a single arrow head for artifact resources 206 and a double arrow head line with a different head style for external resources 208.

Artifact resources 206 are internal to the business model, which means that they are created, updated, and destroyed' within the context of the business model. By "destroyed" it is safe to assume it is meant that they are "removed from the active system and permanently archived". Being purely internal entities, they serve to tie together various parts of the business model to yield a complex overall structure. This happens "in fact" however rather than by model or architectural constraint. The agents remain autonomous: unknowing and uncaring about this consequence of the resources they use.

When used as a resource, business artifacts are not modified in any way. It is generally the case that artifact resources change at a much lower frequency that artifacts are processed with the consequence that except in rare circumstances use a local copy can be presumed. This matches business practice where resources such as price lists, menus, policies, and personnel are updated under the well defined circumstances at well defined times.

External resources 208 are aptly named since they are not only external to the agent 200 which uses them but external to the business model as a whole. External resources are a very powerful feature for integrating existing applications and services into an $IF^2$ business model automation, but improper use can lead to disaster. The external resource is an implementation detail of how an agent accomplishes the business task. The task must, in principle, be performed internally to the agent. Business process diagrams may not show external resources, only agent detail diagrams. The external resource is invisible outside of the agent.

This invention and the $IF^2$ system it relies on are all about automation of business processes: how those processes embody the meaning and intent of "the business"; how that meaning and intent is carefully and precisely described; and how operational embodiments of that meaning and intent are executed. The view point is not the common one. It starts in neither business theory nor technical practice, sociological considerations nor computer science. Instead, it starts at the boundaries between these fields. The advantage of boundaries is precisely that they are not one or the other, but have accessibility from both sides. The boundary between "the business" and its mechanical implementation had become increasingly problematic with the increasing capacity and complexity of both the business and the technology available to it. Serious attempts at resolution from within the business camp as illustrated in Porter's value chain work in M. E. Porter, *Competitive Advantage: Creating and Supporting Superior Performance* (Free Press: June 1998), and the re-engineering craze attributed to Hammer and Champy as illustrated in M. Hammer and J. Champy, *Re-engineering the Corporation: A Manifesto for Business Revolution* (HarperBusiness: May 1994) are well known examples from a deep and broad literature. From within the technology camp, there is a veritable cornucopia of strategies, methodologies, and technologies to choose from including structured programming, object oriented programming, relational technology, client/server technology, and distributed object technology to list but a few. These attempts at solutions to the automation of business processes exist but seem caught in a fad-failure cycle of great internal optimism which corrodes as real applications are encountered. By working from the boundary, $IF^2$ redefines the problem.

The term automation carries the sense of "description to the point of mechanical operation." Indeed, enhancing the capacity and efficiency of "the business" is very much the point. Automation depends on converting understanding of a business's operations, procedures, and intent into execution by a set of technical elements which in turn provide the mechanical operation. Today this requires a long complex series of transformations. Open ended and often fuzzy business understanding must be transformed into execution of that understanding through steps producing definitive requirements and specifications, analysis for technology requirements, logical design, physical implementation, and business implementation. Each of these steps has its own context with methods for determining what is important in the description and solution of problems. Even when smoothed by reuse and standardized components today's path from business need to operational automation is a difficult one.

The motivation for $IF^2$ is to short-circuit this process by creation of a single shared model suitable for understanding and execution in both the business and technical domains. It represents the focal point for business change, the maintenance point for business operations and the testable specification for technical implementations.

Creation of the short-circuit is enabled by four fundamental ideas with deep and rich intellectual histories:

- a general analysis of dynamic systems by factorization into information, function, and flow (hence $IF^2$) components (denoted by the term $IF^2$ factorization);
- that instances have identity and existence independent of the context in which they were created (denoted by the term autonomous existence and implied by the term autonomous attached to entity names);
- that a minimally complex system is obtained when the tradeoff between local and global knowledge in the system is made such that explicit knowledge is localized in autonomous entities while global knowledge is implicit in the interactions of the entities (denoted by the term strong localization); and
- that the granularity of autonomous entities is determined by cognitive recognition of units in the problem domain, not by technical concerns (denoted by the term base-level primacy and implied by the term gestalt unit).

These ideas come together in the $IF^2$ system through the decomposition of business domain content along information, function, and flow dimensions into strongly localized, autonomous individuals denoted as artifacts, tasks or agents, and processes, respectively. The composed entity constituted from these is denoted as a business model. The $IF^2$ business model is the desired short-circuit connecting understanding and execution in the business domain with understanding and execution in the technical domain.

The $IF^2$ Model

As briefly described above, $IF^2$ models are composed from three kinds of elements: artifacts, agents, and processes. A set of instances of each of these three kinds describes a business factorized into information (artifact), function (business task or agent) and flow (process) components. A critical characteristic in $IF^2$ is the separation of type (the corresponding notion in $IF^2$ is category) from instantiation. There is no notion of kind, class, or type within each elemental kind since each individual is taken as a concrete entity in its own right. Individuals are also taken to be localized in the sense that no change in any particular one implies a change in any other one. The granularity of each individual roughly how much knowledge it contains and what that knowledge represents, is taken to be determined by a gestalt unit. When taken together the set of individuals of these three kinds forms a complete model of the business in the sense that there is no knowledge or representation required to describe the business other than that contained in the set of individuals. A more full definition of these concepts follows.

Artifacts Defined: Artifacts are concrete individual units of disjoint information having the property of existence (persistence) in the business model. Within a model the artifacts contain all of the operational information such as contracts, sales slips, personnel folders, and item inventories. The term derives meaning from this physical reference. If the processes and processors (human and machine) vanish what would be left for an archeologist to find? These are the set of "artifacts."

Information systems that seek to structure information do so on a universal, or at least domain wide, basis. Allowable instances are instances of a class (referring to the common understanding of object oriented (OO) classes) or instances of a relation (referring to rows or views in relational schemas). The factorization into separate structure and content components this implies requires that the entire conceptual network of the domain be fixed in advance.

With artifacts (and indeed with agents and flows, although the distinction is not as critical or obvious there), $IF^2$ takes the opposite approach. The existence of concrete individuals is taken as primary and no a priori restrictions are placed on the properties that they may collect over the course of their existence. The domain specific conceptual structure carries in class or relational models is replaced by a taxonomy of categories. Formally, $IF^2$ categories are predicates over artifacts. The predicate is true if the artifact is recognized as being in the category. Note that an artifact is not defined by any category; it may contain more information than required for recognition and may be recognizable under conceptually distinct categories.

Artifacts have the key properties that they:
- are the only container of business information,
- are independent of each other and the context in which they were created,
- may contain arbitrary quantities of information,
- have mathematical properties defined by a formal algebra allowing representation of changes made to an artifacts as algebraic expressions, and
- have, in particular a recognition operation defined within the algebra.

Agents Defined: Individual processing units, where a processing unit may be a single thread, an operating system (OS) level process or job, or a physically distinct CPU as in an embedded computer, provide the sole locus of artifact modification in a business model. Within the model an agent represents a single business task.

Agents have the key properties that they:
- provide externally specified artifact transformations defined by pre-conditions, post conditions and functions expressed as artifact expressions,
- are "flow through" processors where reception and transmission are distinct operations with separately specified connections,
- begin processing with artifact (or event) reception and complete with transmission,
- receive at most a single artifact but may send any number,
- do not depend on the existence of any other agent or any particular connection for their operation, and
- are free to utilize external resources, so long as this doesn't generate an implicit information transfer between agents.

Processes Defined: Business processes represent a portion of a business model that performs the end to end processing of a particular individual artifact. An $IF^2$ process is a composition of agents defined by a topology connecting agent send ports to receive ports.

Figure 3:
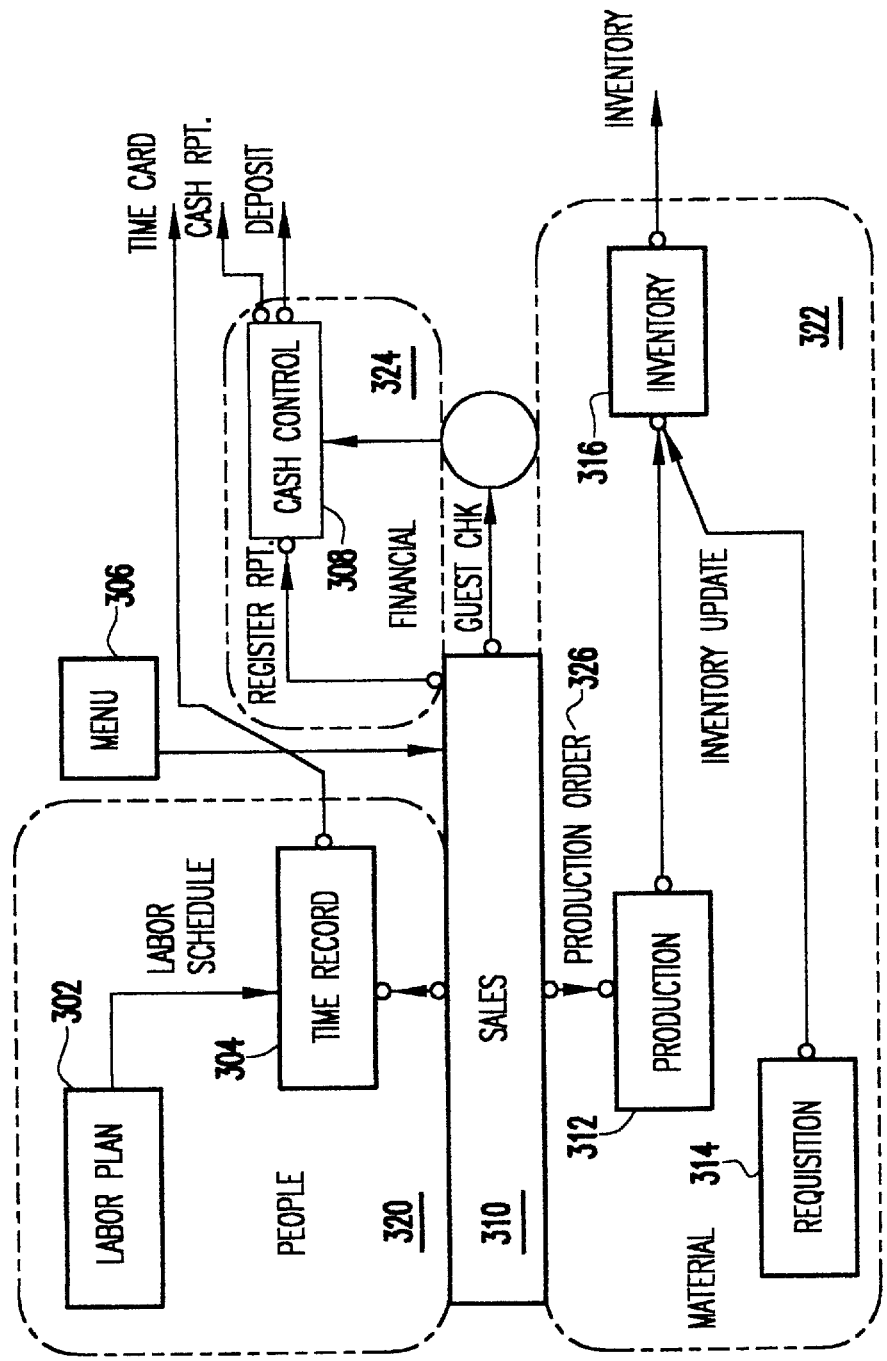
FIG. 3 is a more detailed example of the model for a core business process for quick service restaurants, as shown in FIG. 1, showing the major processes and the artifacts which connect them.

A more detailed example of an $IF^2$ process is shown for a quick-service restaurant in FIG. 3. This model represents the core, customer-to-customer, process of the restaurant. The artifact which records the activity of the process is the GuestReceipt (not shown). Each business task operates by adding information to a particular GuestReceipt and passing it on to the next business task. The pattern of connections comprises the $IF^2$ flow element.

Processes have the key properties that they:
- are the reification of the connection topology,
- enable a mechanism for formal functional analysis of the business, and
- decompose the entire business into interconnected units which can be dealt with independently.

IF² Business models: Justification for factoring a system lies in the interesting insights and capabilities obtained by putting the parts back together. A restrictive formal view suggests that the assembled whole IF² produces is the business model. However, simply drawing all the agents and their connections on one sheet would be quite uninformative. Experience with the complexity of detailed IDEF0 (Integration Definition for Function modeling) or data flow maps also suggests that this is too large a chunk.

Following a divide and conquer strategy, the natural response is to break the overall model into business processes based on some semantic criteria. The IF² notion of a business model decomposes along the process boundaries outlined in the previous paragraph, relying on the insight that objective difference between semantically different processes is that they process different artifacts. The result is that FIG. 3 represents a decomposed chunk of the overall business which occurs in the restaurant as well as a particular topological connection of agents.

Utilizing business processes, the business model can be drawn as shown in FIG. 3. Each square box represents a single business process in the IF² sense, i.e. labor plan 302, time record 304, menu 306, cash control 308, sales 310, production 312, requisition 314, and inventory 316. It is immediately apparent that a softer notion of business process which includes severally functionally related IF² processes can be accommodated. Without sacrificing any ability to map directly to the detail level it is possible to quickly determine "how to run a restaurant." FIG. 3 shows that you need sales 310 and that sales depends on managing people 320, material 322, and funds 324.

A difficulty encountered when decomposing business models into business processes is illustrated by the ProductionOrder path 326, where it is clear that the processes interact with each other. A unique value incorporated in drawings of the form of FIG. 3 is that the connections between the processes retain the exact meaning they have in detailed agent or process diagrams: lines with solid arrow heads connecting small circles indicate the directed flow of artifacts (generally of the category listed); lines with solid arrow heads connecting processes indicate the use of a particular artifact produced by one process as a resource in another. This representation provides an expressive high-level perspective on the detailed operational description of the business. This description can be automatically derived from the detailed IF² business model using the following rules:

- For every named artifact A used in Business Task B which is part of Business Process C, a use relationship is introduced from the Business Process for which A is the primary artifact and the Business Process C; and
- For every non-primary artifact A that is created by Business Task B which is a part of Business Process C, a produce-consume relationship is established between Business Process C and the Business Process that has A as its primary artifact.

Business models have the key properties that they:
- incorporate all the information content, information transformation (function) content, and process (flow) content of some defined portion of a business,
- can be drawn at various levels of generality without loss of detailed traceability to more detailed views,
- provide a complete and unambiguous specification of the content and behavior of a technical implementation, and
- are understandable, manageable, and potentially createable by the business process owner.

Business Advantages of IF²

Internal Advantages of IF₂

The essential advantages of an IF² business model have to do with the distinction and definition of
- the model is immediately understandable and directly manipulable by the business process owner, firmly placing both control of and responsibility for operation of the business in their hands,
- the model elements can be directly embodied in technical components and frameworks yielding a highly modular implementation, and
- the changes in the business model can be implemented with at most linear cost, i.e. the effort of a technical change scales with the complexity and quantity of business change.

The first claim that the business owner controls the model implies that the model elements closely correspond to the natural cognition of business processes. In fact, this is true by construction. The model employs a granularity for the localized elemental units corresponding to the gestalt cognitive units of business process owners. The result of this user friendly model is a high degree of business control over the automation system.

The advantages in the second claim that model elements can be directly embodied in technical components and framework derive from one to one mapping of the business model elements onto a technical components. Evidence from generic prototypes and focused production systems strongly indicate that there are no technical limitations on achieving this. Furthermore, because of the low overhead intrinsic in the model element the performance can be comparable to or even better than conventionally designed systems.

Advantages of direct embodiment include:
- a very high degree of re-use and leverage,
- rigorous component level analysis and testing,
- scaling from embedded controller to main frame at the component level,
- encapsulated integration of legacy functionality, and
- effective support of evolving and "mass customization" situations.

The final claim that changes in the business model can be implemented with at most linear cost affirms that these are not theoretical advantages but eminently practical ones. Not only can the business process owner change the model, those changes can be reflected in the automation system at a predictable cost. Complex changes cannot be made simple but IF² ensures that simple changes are not made difficult. Because the operational system can track the model the model is more likely to be remain a vital instrument for managing the business rather than being relegated to the dusty back shelf reserved for "design input".

Together, these advantages amount to the claim that the IF² business model represents an "executable specification" that bridges understanding and execution of the business system to understanding and execution of the information system. It provides a solution for the critical success factors of flexibility, scaleability, and controllability.

It may seem somewhat paradoxical that the IF² connection between understanding and execution in the business domain with understanding and execution in the technical domain places a boundary between them.

The automation is in effect written by the business process owner responsible for the process. The responsibility of the developers building such a system is for elemental model components, platform infrastructure, and efficient operation rather than for application design in the normal sense. Allowing the individuals involved to focus on the aspects of interest to them (actual business process design or technical infrastructure design) without compromising the overall integrity of the solution leads naturally to an effective, productive, and ultimately more satisfying system for all concerned.

Technical Components

This section briefly outlines some technical considerations for the implementation of $IF^2$. Since several implementations of various sorts exist, it may be viewed as a summary of lessons learned as well as a exposition from the model.

The Missing Application:

If $IF^2$ represents a net gain in expressive power and control for the business, something in the way technical solutions are produced needs to change in compensation. The discussion of the previous section suggests that the change lies in how applications are specified and implemented. The significant change is that an application program does not exist in the commonly understood meaning of the term.

The very source of the problematic nature of the relationship between a business and those developing applications for that business is the intimate coupling of technical programming skills and knowledge of the subtleties of business needs. The point may be driven home by noting that object oriented technologies take a step in the wrong direction on this issue precisely by their touted advantage of identifying technical elements accessible solely by technical experts as the primary representation of the business. The developer is not shielded by layers of analysis and must understand deeply and directly the content and intent of that component of the business. Similarly, the business cannot avoid dealing directly with the nature and structure of the technical business objects. In contrast, $IF^2$ cleanly separates the technical skill required to implement a system from the business knowledge. In return for this significant advantage $IF^2$ extracts the price of abandoning that embodiment of inextricably entangled technical and business knowledge, the application.

In $IF^2$, the noun form of the term automation (as in "an automation of the business") extends and replaces the term application.

The Base Classes

The base class structure of an $IF^2$ implementation captures the functionality of the three elemental kinds. Although not architecturally constrained to be so, most existing design and implementation of the $IF^2$ base classes are in object oriented (OO) languages, as might be surmised from the fact that they are called the base classes not the "core code". An object model for the required classes is shown in FIG. 4.

Figure 4:
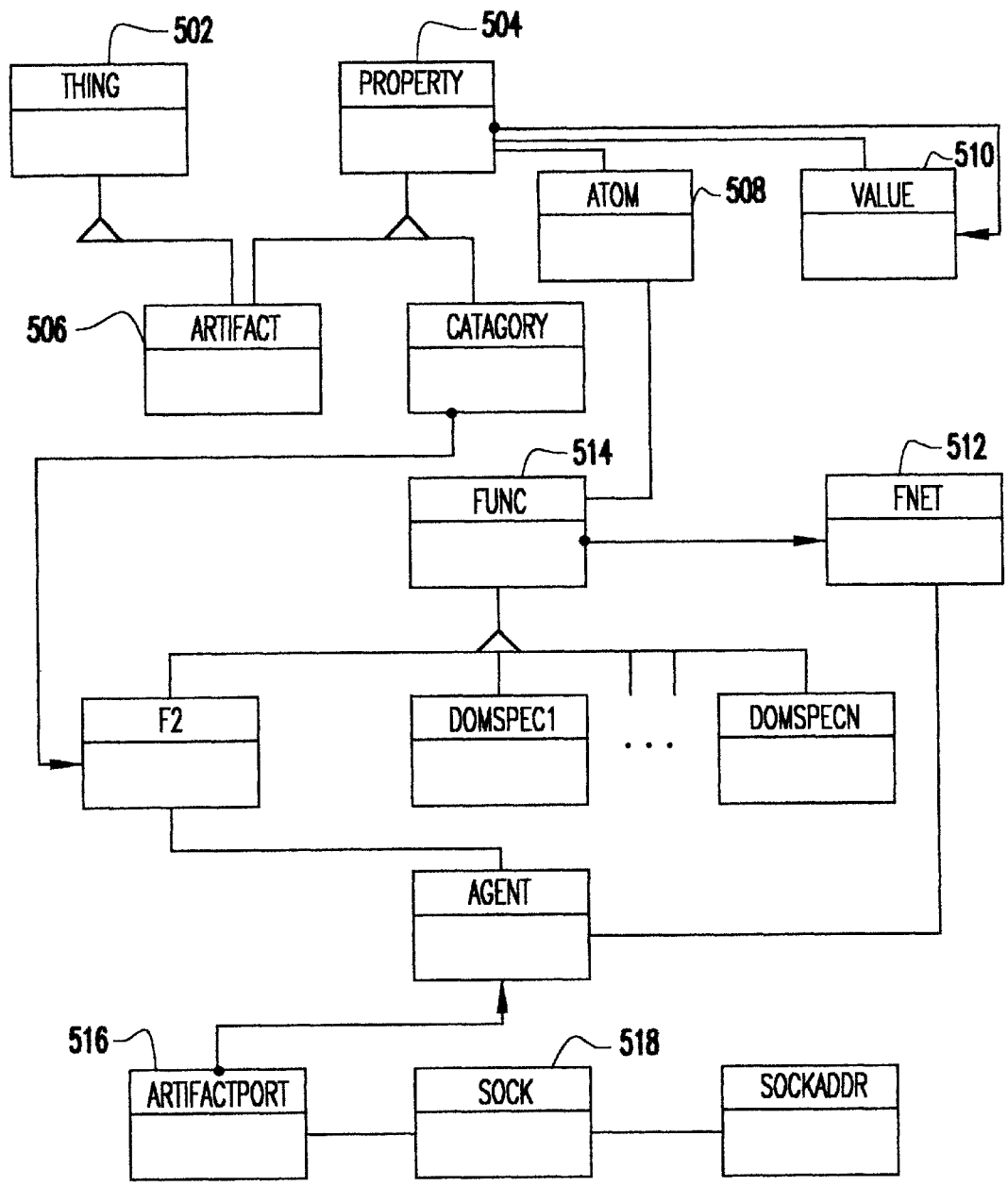
FIG. 4 shows an object model for an IF² implementation.

FIG. 4 is a standard class hierarchy diagram that is well understood by one skilled in the art of object oriented (O-O) development. A text explaining class hierarchy representation is G. Booch, *Object-Oriented Analysis and Design with Applications*, (Addison-Wesley: 1994). The purpose of this class diagram is to demonstrate the implementability of the basic $IF^2$ constructs viz. artifacts, categories, agents, etc. It would be apparent to one skilled in the art of object oriented programming that the class structure covers artifacts and agents but not processes. In $IF^2$ execution environments the fundamental dispatch unit is the agent, so process construction is not covered by this level of programming.

Artifacts implementation: Artifacts are implemented as a single class-level interface providing methods for the formal algebra operations. In $IF^2$, there is no implementation of, say, a GuestCheck object per se. All the properties of the GuestCheck are contained within the artifact. Behind this interface a variety of general purpose and specialized implementations are possible. Many implementations will differ only in the external or physical representation of the artifact. Some examples are the native text representation, EDI (Electronic Data Interchange) transaction representation, or XML (extended markup language) representations each of which may be physically located in files, data bases, or logical sources such as web servers, GUI (graphical user interface) components, or legacy applications.

The internal structure of artifacts can be seen in FIG. 4. The important design distinction is the composition of artifacts from a Thing part 502 which carries the individual existence properties of the artifact and a Property part 504 which carries the information content. This allows the instantiation of "stand alone" properties which are used to implement $IF^2$ categories.

The critical interfaces in the Artifact class family 506 are the algebraic operations. These form the "hooks" from which the business domain logic at the business task (i.e., agent) level are constructed.

Less critical are the Atom 508 and Value 510 classes used to constitute Property 504. While the actual structure of $IF^2$ properties is very simple and an extremely compact and efficient implementation can be generated from scratch, the desire to include large existing programming systems and APIs (application program interfaces) is most often expressed here. Implementations based on LEX and YACC tools, commercial dictionary tools, dynamic relational database management systems (RDBMS) schema generators, and XML/DOM have been built. The criteria applied to any implementation must focus on its central nature: the artifact code is by far the most executed code in any $IF^2$ implementation. Since the interface is determined by the Artifact and Category classes, the code behind them must be extremely stable and inaccessible to the normal programmer. The stability and reliability of the system overall will be utterly dependent on the stability and reliability of any tools, libraries, or APIs utilized.

Both artifacts and categories are constructed using a grammar that specifies the construction of recursive name-value pairs. The following representation shows a concise technical account of how an artifact may be constructed.

TOKEN: "nil"|+[a–zA–Z0–9$+–_/.];
OINT: [Oo]+[0–7]
HINT: [Xx]+[0–9,A–H,a–h];
INT: +[0–9]|OINT|HINT;
ID: "@" HINT ":" HINT
CID: "~" HINT ":" HINT
STRING: TOKEN|"\"" *[^"]*"\"";
COMMENT: "{"*[^}]*"}";
SPACE: +[^a–zA-Z0–9$+–_/.( ){ }#];
OPEN: "("|"("ID |"("CID;
CLOSE: ")";

A name is a TOKEN and a value can be null, a string constant, an atom or a collection of one or more name value pairs. The grammar spells out the essential details of this construction. It is important to note that both artifacts and categories can be constructed using this grammar. This enables the process of recognition, i.e., determining that an artifact instance conforms to the pattern specified by the category.

For instance an artifact may be created based on the grammar above, as follows:

```
person ( ID 1000015
        ssn 515-00-0977
        DOB "Jan 06, 1974"
        name (given Francis mid O. family Smith)
        address (
            street "833 Monongahila Ave."
            city "Valparaiso" state FL zip 32580
        )
        goal "... ... ..."
)
```

The "name" is a role (property) name. "Value" is an instance of the concept of filling the role.

Basically, the only syntactical elements of the grammar are TOKEN which consists of either of simple tokens or strings and "( )" used to denote the start and finish of values. Tokens in the input stream may be separated by arbitrary SPACE characters so structures like name(first:fred, last:smith) are possible, but deprecated.

The following representation shows a concise technical account of how a category may be constructed.

| object | : | name value \| name value comment; |
| name   | : | "~" \| TOKEN; |
| value  | : | OPEN CLOSE \| STRING \| OPEN o-list CLOSE \| batom; |
| olist  | : | olist object \| object \| nil; |
| tlist  | : | tlist TOKEN \| TOKEN; |
| batom  | : | "#" INT "#"; |

Externally, artifacts and categories are represented by recursive name-value pairs.

Agents implementation: The implementation of agents provides the concrete framework into which algebraic transformation of artifacts, artifact creation, and management of external resources occurs. The few lines of code required to insert this into the framework represents the total "programming" effort of creating an It automation. Because an agent's business functionality and interface is specified completely externally, the internal implementation is very flexible. One common and very useful implementation is to utilize legacy applications as an external resource. This provides a very structured approach to system integration with the capacity for incremental replacement of legacy with other legacy or native agent code. It also enables a wide scaleability range since the utilization of an agent embedded in a microcontroller is functionally identical to the utilization of the same agent scaled to a large Sysplex.

The class structure of FIG. 4 suggests a strategy for allowing disciplined creation of modules at the sub-agent level. The FNet class 512 is essentially a sequencer for functions which take an artifact argument (i.e., the Function) class 514. The actual artifact expressions and other code which make up the agent functionality is encapsulated in the objects derived from Func 514. There is a design choice regarding the relationship of Func 514 and FNet 512. In one design FNet 512 contains the logic to determine the sequence of synchronous calls to the various objects derived from Function. An alternate design, more in keeping with the spirit of $IF^2$, has the Function:execute( ) method (not shown) return a pointer to the next function to be called. This reduces FNet 512 to a simple loop, allows direct implementation of the $IF_2$ notion of second order functions, and keeps the branch decision in the same method as the computation on which it depends (rather than in the calling function).

Overloading the Function:execute( ) method is the only "user" level programming access point in an $IF^2$ system. Internally, this method has access to agent level read only resources and is free to interact with external systems in any way required. Externally, the sole interface to the rest of the $IF_2$ implementation is through the single artifact passed in as an argument and the artifact that it returns. Other side effects are strongly disparaged and to be used only after careful consideration and review.

Figure 5:
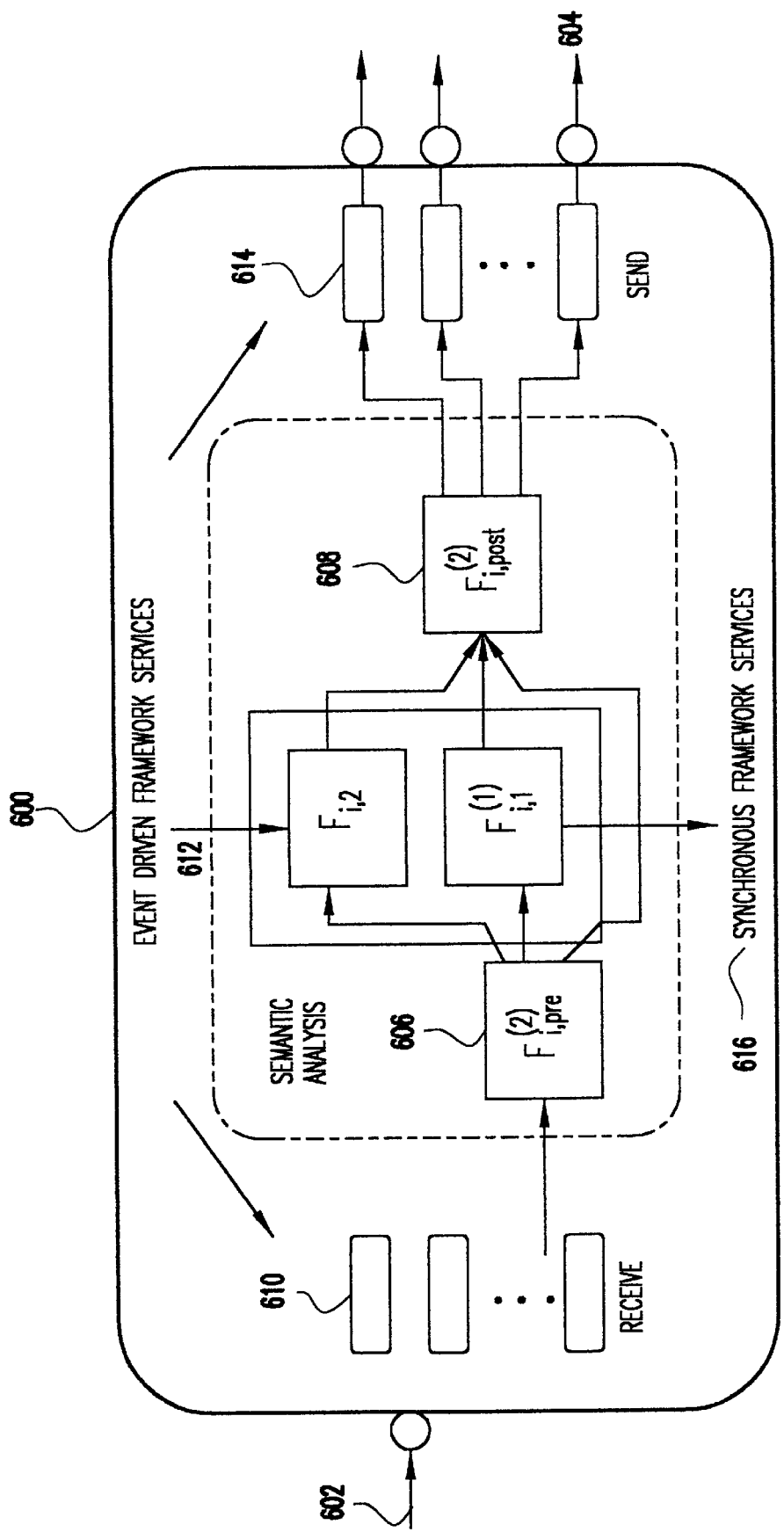
FIG. 5 is an agent internal structure showing control flow and services layering.

Another view of agent implementation is shown in FIG. 5. It primarily shows the control structure of an agent 600. In the simple case, processing is started when an artifact arrives at the receive port 602 and finishes when the artifact is sent from a send port 604. This view also emphasizes the role of recognition (implemented in the form of second order functions 606 and 608 which return the next function to execute based on the artifact argument) in the semantic analysis layer. Additionally, the various services provided by the agent framework 610, 612, 614, and 616 are shown. One distinction to be made among the services is between synchronous services 616 which do not effect the control flow, and event driven services 610, 612 and 614 which do. In particular, an agent function may receive control directly from an external event rather than through receipt of an artifact.

Processes implementation: The implementation of business processes centers on the specification of where agent instances are to run (physical location and specific processor at that location), the technical configuration information needed to connect the agent to its defined resources, and the explicit $IF^2$ flow component contained in the point to point connections between agent instances.

Referring again to FIG. 4, the hooks for this are shown in the ArtifactPort class 516. It needs the basic send( ) and receive( ) methods (not shown) along with configuration and management methods. The socket based classes 518 shown are schematic and suggestive only, since more direct methods (shared memory transfer or kernel based messaging for example) may be more effective on specific platforms. Even within a socket based approach there is a design decision between packet based (i.e., User datagram protocol (UDP)) sockets and stream (i.e., Transmission Control Protocol (TCP)) sockets. This is an interesting case where the overhead of transferring packet management to the more capable stream sockets may involve more, and more complex, code than simply managing the packets directly.

Networks of agents can be instantiated and run in a wide variety of ways ranging from manual invocation to fully automated system management.

Technical Infrastructure

Some technical decisions cut across all of the base classes and system level tools. They will also have significant impacts on the performance, maintainability and manageability of the operational system. Key areas are the Communication and storage of artifacts between agents. The design decisions will of necessity be platform and tool dependent, but need not be homogeneous across a particular system or even within a particular platform.

The communication infrastructure touched on above is a prime candidate for a heterogeneous approach. Communication between agents on a single platform can almost certainly be performed more efficiently than the serialization to an architecture neutral form and socket transmission required for communication between agents on different platforms. Most platforms provide some sort of shared memory transfer (Windows through user generated window events and manipulation of the x86 segment structure and Unix systems through more general shared memory APIs) and some provide fast, atomic, kernel based messaging services even across network connections.

Another service which spreads across artifact, agent, and process boundaries is the artifact repository. Artifacts may be persistent as a matter of course rather than by explicit loading or retrieval from a repository. While buried in the artifact object implementation, good design implies a coupling with repository infrastructure services. Agents may utilize repository services internally as queues, work in progress storage, or private auxiliary storage. At the process level, artifact resources and "get-able" artifact resources depend on access to artifact repositories. Finally, artifact repositories provide the terminal point of processes and so must accept agent-like input connections.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for constructing a system to implement a particular business process, comprising the steps:
    identifying one or more pieces of paper used in a business process and containing information, and representing each said piece of paper as an instance of an information container, said information container having a blank type compatible with any information in said business process, all information in said business process being contained in, and being a content of, one or more of said instances;
    identifying one or more tasks in said business process and providing representations for each, each said task being connected to an instance of an information container by an input from a person in a business domain based on examination by said person of a content of the piece of paper being represented by said instance of said information container, said content determining a business category of said instance of said information container, said task optionally modifying said content and optionally sending said instance of said information container to another task; and
    defining a path from task to task for each said instance of said typeless information container, said path being a topology determined by said business category,
    wherein said system is implemented by a technical domain, and wherein said content, said business category and said paths are determinable by a business domain without reference to consequent modification of said system by said technical domain.

2. A method as recited in claim 1, wherein each task identification step is implemented in said system as an instance of an agent, said implementation further comprising the steps:
    identifying work locations for each task corresponding to each of said agent instances;
    identifying physical resources of said system where said agent instances may run; and
    mapping said physical resources of an agent instance to a work location of a corresponding task.

3. A method as recited in claim 1, wherein said content of said instance of said typeless information container comprises operational information for said business process, each said instance of said typeless information container being independent of other said instances, and said operational information comprising one or more units of typeless information, said typeless information having a set of category recognition predicates determinable by said business domain.

4. A method as recited in claim 1, wherein a task provides externally specified transformations defined by preconditions, post-conditions and functions expressed as content of an instance of an information container, said instance being an artifact, said task receiving exactly one artifact via an artifact receive port and sending at least one artifact via at least one artifact send port.

5. A method as recited in claim 1, wherein said system implementation is performed by using information about end to end processing of an instance of an information container such that said instance passes among tasks via a plurality of send and a plurality of receive ports, said plurality of tasks being defined by a topology connecting a plurality of task send ports to a plurality of task receive ports.

6. A method as recited in claim 1, wherein said paths are defined such that connections determine sequence as in a directed graph.

7. A method as recited in claim 1, wherein said system implementation is performed using information, function, flow (IF2) model elements according to a specification comprising said typeless information containers, said tasks, and said paths by encapsulating communication paths among said at least one task enabling task-to-task transfer.

8. A machine readable medium containing code to implement a particular business process, the code implementing the steps of:
    identifying one or more pieces of paper used in a business process and containing information, and representing each said piece of paper as an instance of an information container, said information container having a blank type compatible with any information in said business process, all information in said business process being contained in, and being a content of, one or more of said instances;
    identifying one or more tasks in said business process and providing representations for each, each said task being connected to an instance of an information container by an input from a person in a business domain based on examination by said person of a content of the piece of paper being represented by said instance of said information container, said content determining a business category of said instance of said information container, said task optionally modifying said content, and optionally sending said instance of said information container to another task; and
    defining a path from task to task for each said instance of said typeless information container, said path being a topology determined by said business category,
    wherein said system is implemented by a technical domain, and wherein said content, said business category and said paths are determinable by a business domain without reference to consequent modification of said system by said technical domain.

9. An apparatus for constructing a representation of a single shared model suitable for understanding and execution in both the business and technical domains, comprising:
    means for identifying one or more pieces of paper used in a business process and containing information, and means for representing each said piece of paper as an instance of an information container, said information container having a blank type compatible with any information in said business process, all information in said business process being contained in and being a content of, one or more of said instances;

means for identifying one or more tasks in said business process and providing representations for each, each said task being connected to an instance of an information container by an input from a person in a business domain based on examination by said person of a content of the piece of paper being represented by said instance of said information container, said content determining a business category of said instance of said information container, said task optionally modifying said content and optionally sending said instance of said information container to another task; and means for defining a path from task to task for each said instance of said typeless information container, said path being a topology determined by said business category, wherein said system is implemented by a technical domain, and wherein said content, said business category and said paths are determinable by a business domain without reference to consequent modification of said system by said technical domain.

\* \* \* \* \*